United States Patent
Finlay et al.

(10) Patent No.: US 9,916,318 B2
(45) Date of Patent: Mar. 13, 2018

(54) METHOD OF REUSING EXISTING STATISTICS TO LOAD DATABASE TABLES

(71) Applicant: International Business Machines Corporation, Armonk, NY (US)

(72) Inventors: Ian R. Finlay, Uxbridge (CA); Robin D. Grosman, Markham (CA); Uttam Setty, Bangalore (IN); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/982,159

(22) Filed: Dec. 29, 2015

(65) Prior Publication Data
US 2017/0185624 A1  Jun. 29, 2017

(51) Int. Cl.
*G06F 17/30* (2006.01)
*G06F 15/16* (2006.01)

(52) U.S. Cl.
CPC .. *G06F 17/30153* (2013.01); *G06F 17/30289* (2013.01); *G06F 17/30339* (2013.01); *G06F 17/30952* (2013.01)

(58) Field of Classification Search
None
See application file for complete search history.

(56) References Cited

U.S. PATENT DOCUMENTS

| | | | | |
|---|---|---|---|---|
| 6,141,699 | A * | 10/2000 | Luzzi | G06F 11/3495 707/999.01 |
| 7,490,093 | B2 | 2/2009 | Jain et al. | |
| 8,392,406 | B1 * | 3/2013 | Emekci | G06F 17/30501 707/688 |
| 9,020,910 | B2 | 4/2015 | Bendel et al. | |
| 2001/0037228 | A1 | 11/2001 | Ito et al. | |
| 2005/0198062 | A1 * | 9/2005 | Shapiro | G06F 17/30339 |
| 2013/0054626 | A1 | 2/2013 | Kuehler et al. | |

OTHER PUBLICATIONS

Chen, et al.; "Leveraging DB2 10 for High Performance of Your Data Warehouse"; IBM Information Management Software; Jan. 2014; © International Business Machines Corporation 2014; pp. 1-218.
U.S. Appl. No. 15/130,067, filed Apr. 15, 2016; Entitled "Method of Reusing Existing Statistics to Load Database Tables".
List of IBM Patents or Patent Applications Treated as Related; Dated Apr. 15, 2016; 2 pages.

* cited by examiner

*Primary Examiner* — Alex Gofman
(74) *Attorney, Agent, or Firm* — Edward J. Wixted, III

(57) ABSTRACT

An indication to load data into a database table is received. A determination is made whether an existing set of frequency distribution statistics is available. In response to determining that an existing set of frequency distribution statistics is available, the data is loaded into the database table using the existing set of frequency distribution statistics.

9 Claims, 2 Drawing Sheets

METHOD OF REUSING EXISTING STATISTICS TO LOAD DATABASE TABLES

BACKGROUND OF THE INVENTION

The present invention relates generally to the field of database management systems (DBMS), and more particularly to loading data into database tables.

A database is an organized collection of data. It is the collection of schemes, tables, queries, reports, views, and other objects. The data is typically organized to model aspects of reality in a way that supports processes requiring information, such as modelling the availability of rooms in hotels in a way that supports finding a hotel with vacancies.

A database management system (DBMS) is a computer software application that interacts with the user, other applications, and the database itself to capture and analyze data. A general-purpose DBMS is designed to allow the definition, creation, querying, update, and administration of databases. A database is not generally portable across different DBMSs, but different DBMS can interoperate by using certain standards to allow a single application to work with more than one DBMS. Database management systems are often classified according to the database model that they support. Sometimes a DBMS may be loosely referred to as a 'database'.

SUMMARY

Embodiments of the present invention include a method, computer program product, and system for using existing frequency distribution statistics to load data into database tables. In one embodiment, an indication to load data into a database table is received. A determination is made whether an existing set of frequency distribution statistics is available. In response to determining that an existing set of frequency distribution statistics is available, the data is loaded into the database table using the existing set of frequency distribution statistics.

DETAILED DESCRIPTION

Some embodiments of the present invention recognize that to efficiently load data into tables of a database management system (DBMS), the DBMS data movement utility (e.g., LOAD) must first analyze the input data to determine the frequency histograms of the input data values. Those frequency histograms may be used to create compression dictionaries and hence they should be as accurate as possible for the DBMS to function in an optimal condition. A compression dictionary may be a simple lookup table which uses fewer bits to store data when compared to the actual data itself. Modern DBMSs allow for either (a) the user to specify which subset of input data is analyzed to create the frequency histograms or (b) the DBMS itself to determine which data is analyzed. If the selected subset of input data is not sufficiently representative of the entire data set, the frequency histograms may be less accurate which may affect the performance of the DBMS.

Embodiments of the present invention recognize that there may be a method, computer program product, and system to efficiently load data into DBMS tables that will save costs without compromising the quality of the frequency histograms. A data movement utility, such as the LOAD function found in a DBMS, may utilize existing frequency distribution statistics rather than analyzing the input data to generate those same statistics. The existing statistics may be generated by any software tool which provides data quality assessment and analysis prior to the data movement utility request. By using the existing statistics, the data movement utility does not need to analyze the input data Eliminating this analysis may result in a cost savings without impacting the quality of the frequency histograms. The time required to generate the statistics, used in query processing, at the completion of the data movement utility is also significantly reduced since the existing frequency distribution statistics already include most of the required information.

Figure 1:
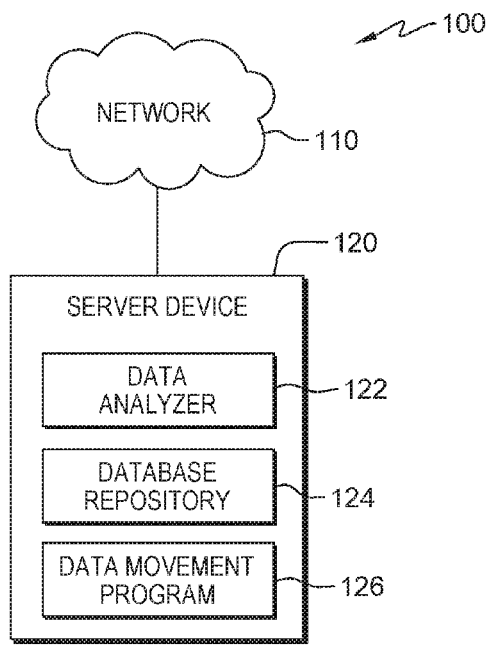
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes server device 120 connected to network 110. In an example embodiment, utilizing network 110, server device 120 may communicate with any other device (not shown) in computing environment 100. In example embodiments, computing environment 100 may include other computing devices not shown such as smartwatches, cell phones, smartphones, phablets, tablet computers, laptop computers, desktop computers, other computer servers or any other computer system known in the art, interconnected with server device 120 over network 110.

In example embodiments, server device 120 may connect to network 110 which enables server device 120 to access other computing devices and/or data not directly stored on server device 120. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between server device 120 and other computing devices (not shown) within computing environment 100, in accordance with embodiments of the present invention.

In various embodiments of the present invention, server device 120 may be a laptop, tablet or netbook personal computer (PC), a desktop computer, a personal digital assistant (PDA), a smartphone, or any other hand-held, programmable electronic device capable of communicating with any computing device within computing environment 100. In certain embodiments, server device 120 represents a computer system utilizing clustered computers and components (e.g., database server computers, application server computers, etc.) that act as a single pool of seamless resources when accessed by elements of computing environment 100. In general, server device 120 is representative of any electronic device or combination of electronic devices capable of executing computer readable program instructions. Computing environment 100 may include any number of server device 120. Server device 120 may include components as depicted and described in further detail with respect to FIG. 3, in accordance with embodiments of the present invention.

According to embodiments of the present invention, server device 120 includes data analyzer 122, database repository 124, and data movement program 126. Data analyzer 122 may be a program, subprogram of a larger program, application, plurality of applications or mobile application software which provides data quality assessment, data analysis, data quality monitoring, and data rule design. Database repository 124 may be storage that may be written to and/or read by data movement program 126. Data movement program 126 may be a program, subprogram of a larger program, application, plurality of applications or mobile application software which uses existing frequency distribution statistics to load data into database tables.

In an embodiment, data analyzer 122 may be a program, subprogram of a larger program, application, plurality of applications or mobile application software which provides data quality assessment, data analysis, data quality monitoring, and data rule design. This type of program allows a user to glean more meaning from enterprise data, reduce the risk of proliferating incorrect data, deliver trusted content, and reduce data integration costs. According to an embodiment of the present invention, the data quality assessment and data analysis provided by data analyzer 122 may include data frequency distribution statistics. These statistics may be used by a DBMS to create a compression dictionary which is used to load data into the DBMS tables. A compression dictionary may be a simple lookup table which uses fewer bits to store data when compared to the actual data itself.

In an embodiment, database repository 124 may be storage that may be written to and/or read by data movement program 126. In one embodiment, database repository 124 resides on server device 120. In other embodiments, database repository 124 may reside on any other device (not shown) in computing environment 100, in cloud storage or on another computing device accessible via network 110. In yet another embodiment, database repository 124 may represent multiple storage devices within server device 120. Database repository 124 may be implemented using any volatile or non-volatile storage media for storing information, as known in the art. For example, database repository 124 may be implemented with a tape library, optical library, one or more independent hard disk drives, multiple hard disk drives in a redundant array of independent disks (RAID), solid-state drives (SSD), or random-access memory (RAM). Similarly, database repository 124 may be implemented with any suitable storage architecture known in the art, such as a relational database, an object-oriented database, or one or more tables. In an embodiment of the present invention, data sent or received by data movement program 126 may be stored to database repository 124. Examples of data stored to database repository 124 include the input data being loaded into the DBMS tables or the frequency distribution statistics determined by data analyzer 122.

In an embodiment, data movement program 126 may be a program, subprogram of a larger program, application, plurality of applications or mobile application software which uses existing frequency distribution statistics to create compression dictionaries and load data into database tables. Mobile application software, or an "app," is a computer program designed to run on smartphones, phablets, tablet computers and other mobile devices. In one embodiment, data movement program 126 functions as a stand-alone program residing on server device 120. In another embodiment, data movement program 126 may be included in a DBMS (not shown). In yet another embodiment, data movement program 126 may work in conjunction with other programs, applications, etc., found on server device 120 or in computing environment 100. In yet another embodiment, data movement program 126 may be found on other computing devices (not shown) in computing environment 100 which are interconnected to server device 120 via network 110.

According to embodiments of the present invention, data movement program 126 retrieves or receives existing data frequency distribution statistics from a data quality assessment and analysis tool (e.g., data analyzer 122) for use by a DBMS prior to loading input data into a DBMS table. Using the existing frequency distribution statistics saves the DBMS from having to create those statistics for use by the utility. The statistics generated by a data quality and assessment tool (i.e., data analyzer 122) are more accurate than those created by a DBMS since the quality and assessment tool is able to consider all of the input data while the DBMS only analyzes a portion of the input data to build the data frequency distribution statistics.

Figure 2:
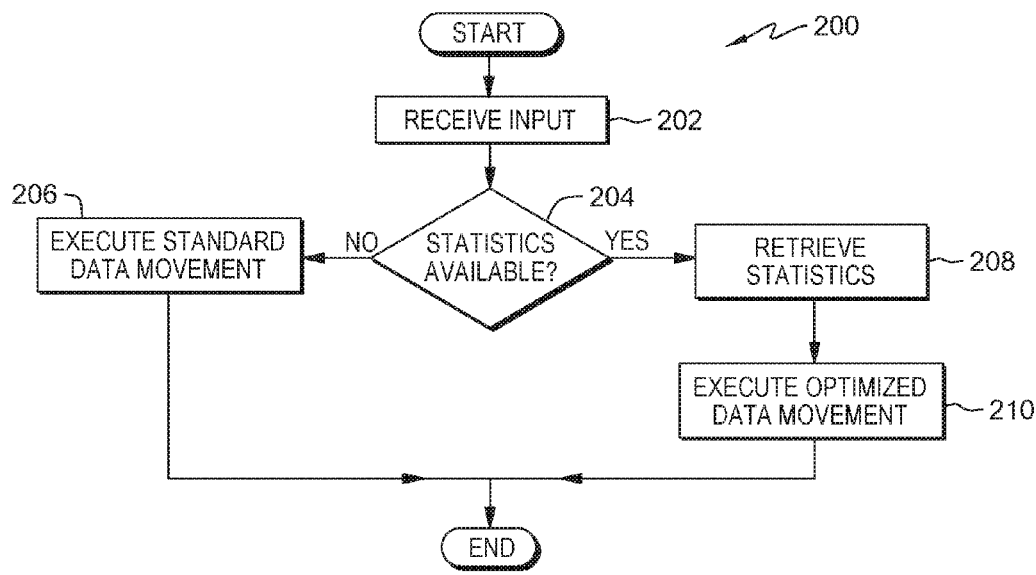
FIG. 2 is a flowchart depicting operational steps of a program that functions to using existing frequency distribution statistics to load data into database tables, in accordance with an embodiment of the present invention.

FIG. 2 is a flowchart of workflow 200 depicting operational steps using existing frequency distribution statistics to load data into database tables. In one embodiment, data movement program 126 performs the operational steps. In an alternative embodiment, any other program, while working with data movement program 126, may perform the operational steps. In an embodiment, data movement program 126 may invoke workflow 200 upon the request of a user. In an alternative embodiment, data movement program 126 may invoke operational steps automatically when new data is received. In an embodiment, the operational steps may be performed in any order.

Data movement program 126 receives input (step 202). In other words, data movement program 126 receives input that a DBMS has received a request to load data into a DBMS table. In an embodiment, a user opens a DBMS tool (not shown) and prepares to load input data, stored to database repository 124, into a DBMS table. In another embodiment, a DBMS receives a request from another program to load data into a DBMS table. For example, a high school principal prepares to load data into a DBMS concerning the student population of the school.

Data movement program 126 determines whether statistics are available (decision step 204). In other words, data movement program 126 determines whether there are existing frequency distribution statistics, for the data being input to a DBMS table, from a data quality assessment and analysis tool (e.g., data analyzer 122) available for use by a DBMS. In one embodiment, data movement program 126 determines that there are not existing frequency distribution statistics available (decision step 204, NO branch) and data movement program 126 loads the table data in the standard manner (step 206). In another embodiment, data movement program 126 determines that there are existing frequency distribution statistics available (decision step 204, YES branch) and data movement program 126 retrieves those existing statistics (step 208).

Data movement program 126 executes standard data movement (step 206). In other words, responsive to determining in decision step 204 that frequency distribution statistics were not available, data movement program 126 analyzes the input data and calculates the data frequency distribution statistics by sampling a portion of the input data. In an embodiment, data movement program 126 determines the frequency distribution statistics for the input data in order to create the necessary compression dictionary. For example, data movement program 126 calculates the frequency distribution statistics for the student population of the high school. The student population at the high school is as follows: the freshman class includes thirty students, fifteen males and fifteen females; the sophomore class includes fifty students, twenty males and thirty females; the junior class includes thirty-five students, twenty-five males and ten females; and the senior class includes sixty students, thirty males and thirty females. The total student population is one hundred seventy-five students. To calculate the frequency distribution statistics, data movement program 126 samples the junior class to determine that the frequency of males to females is two and a half to one (twenty-five males to ten females).

Data movement program 126 retrieves the statistics (step 208). In other words, responsive to determining in decision step 204 that frequency distribution statistics were available, data movement program 126 retrieves those statistics from the data quality assessment and analysis tool, such as data analyzer 122, which determined the statistics. In one embodiment, the statistics are retrieved by data movement program 126 directly from data analyzer 122. In another embodiment, the frequency distribution statistics are sent by data analyzer 122 to data movement program 126 for use by the data movement utility. In yet another embodiment, the frequency distribution statistics are stored to database repository 124 by data analyzer 122 and are retrieved from database repository 124 by data movement program 126. In yet another embodiment, a user or program which initiates the data movement request may directly pass on the frequency distribution statistics to the data movement utility. In yet another embodiment, a user or program which initiates the data movement request may directly pass on a reference to the frequency distribution statistics to the data movement utility. For example, the data quality assessment and analysis tool calculates the frequency distribution statistics for the student population of the high school. The student population at the high school the same as previously described. To calculate the frequency distribution statistics, the data quality assessment and analysis tool includes the entire student population to determine that the frequency of males to females is one to one (ninety males to eighty-five females). The male to female frequency, as determined by the data movement utility and based on only the junior class sample, of two and a half to one is highly inaccurate compared to the frequency of one to one determined by using the entire student population.

Data movement program 126 executes optimized data movement (step 210). In other words, data movement program 126 uses the statistics retrieved in step 208 to create compression dictionaries and loads the input data into the DBMS table. In one embodiment, a full set of frequency distribution statistics is available from data analyzer 122 which enables data movement program 126 to use those statistics to load the DBMS table without taking the time or expending the resources to analyze the input data needed to create frequency distribution statistics for the input data. In another embodiment, only a partial set of frequency distribution statistics is available from data analyzer 122. In this embodiment, data movement program 126 uses the partial statistics in conjunction with analyzing the input data to create any missing frequency distribution statistics. The result of the partial statistics and the statistics created by analyzing the input data is a complete set of frequency distribution statistics needed to load the input data into the DBMS table.

Figure 3:
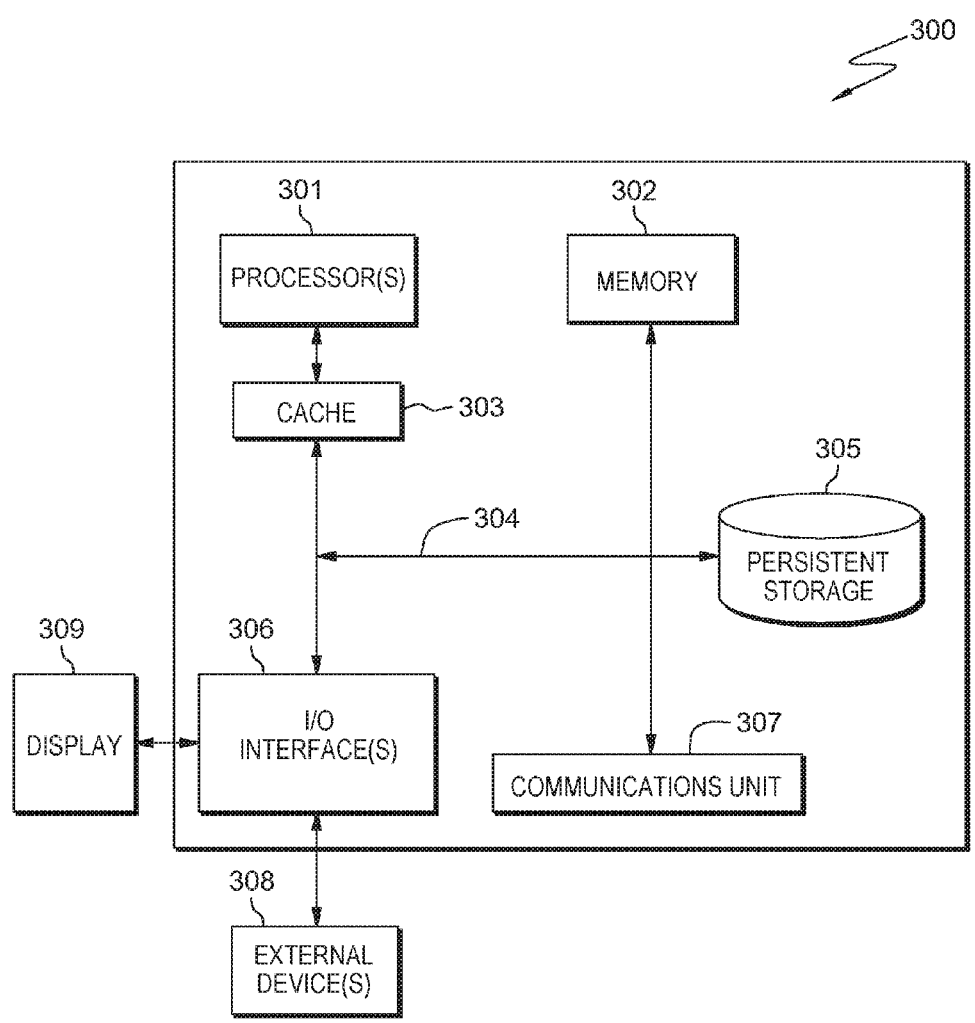
FIG. 3 depicts a block diagram of the components of the computing system of FIG. 1, in accordance with an embodiment of the present invention.

FIG. 3 depicts computer system 300 which is an example of a system that includes data movement program 126. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for using existing frequency distribution statistics to load data into database tables, the method comprising:
    receiving, by one or more computer processors, an indication to load data into a database table included in a database management system, wherein the data consists of a first portion of data and a second portion of data;
    determining, by one or more computer processors, whether an existing set of frequency distribution statistics for the data is available, wherein the existing set of frequency distribution statistics are generated independently of the database management system prior to loading the data into the database management system, and wherein the existing set of frequency distribution statistics is generated using substantially all of the data;
    responsive to determining that an existing set of frequency distribution statistics is not available for the first portion of data but an existing set of frequency distribution statistics is available for the second portion of data, generating, by one or more computer processors, a set of frequency distribution statistics for the first portion of data, wherein the generated set of frequency distribution statistics is generated by the database management system using a sample of the first portion of data;
    responsive to generating a set of frequency distribution statistics for the first portion of data that does not have the existing set of frequency distribution statistics available, creating, by one or more computer processors, a first compression dictionary for the first portion of data using the generated set of frequency distribution statistics;
    creating, by one or more computer processors, a second compression dictionary for the second portion of data using the existing set of frequency distribution statistics; and
    loading, by one or more computer processors, the data into the database table using the first compression dictionary and the second compression dictionary.

2. The method of claim 1, further comprising:
    responsive to determining that an existing set of frequency distribution statistics for the data is not available, generating, by one or more computer processors, a set of frequency distribution statistics for the data;
    creating, by one or more computer processors, a third compression dictionary using the generated set of frequency distribution statistics; and
    loading, by one or more computer processors, the data into the database table using the third compression dictionary.

3. The method of claim 2, wherein the first compression dictionary, the second compression dictionary, and the third compression dictionary are each a simple lookup table which uses fewer bits to store data when compared to the data itself.

4. A computer program product for using existing frequency distribution statistics to load data into a database table, the computer program product comprising:
    one or more computer readable storage media; and
    program instruction stored on the one or more computer readable storage media, the program instructions comprising:
        program instructions to receive an indication to load data into a database table included in a database management system, wherein the data consists of a first portion of data and a second portion of data;
        program instructions to determine whether an existing set of frequency distribution statistics for the data is available, wherein the existing set of frequency distribution statistics are generated independently of the database management system prior to loading the data into the database management system, and wherein the existing set of frequency distribution statistics is generated using substantially all of the data;
        responsive to determining that an existing set of frequency distribution statistics is not available for the first portion of data but an existing set of frequency distribution statistics is available for the second portion of data, program instructions to generate a set of frequency distribution statistics for the first portion of data, wherein the generated set of frequency distribution statistics is generated by the database management system using a sample of the first portion of data;
        responsive to generating a set of frequency distribution statistics for the first portion of data that does not have the existing set of frequency distribution statistics available, program instructions to create a first compression dictionary for the first portion of data using the generated set of frequency distribution statistics;
        program instructions to create a second compression dictionary for the second portion of data using the existing set of frequency distribution statistics for the second portion of data; and
        program instructions to load the data into the database table using the first compression dictionary and the second compression dictionary.

5. The computer program product of claim 4, further comprising program instructions stored on the one or more computer readable storage media, to:
    responsive to determining that an existing set of frequency distribution statistics for the data is not available, generate a set of frequency distribution statistics for the data;
    create a third compression dictionary using the generated set of frequency distribution statistics; and
    load the data into the database table using the third compression dictionary.

6. The computer program product of claim 5, wherein the first compression dictionary the second compression dictionary, and the third compression dictionary are each a simple lookup table which uses fewer bits to store data when compared to the data itself.

7. A computer system for using existing frequency distribution statistics to load data into a database table, the computer system comprising:
- one or more computer processors;
- one or more computer readable storage media; and
- program instruction stored on the one or more computer readable storage media for execution by at least one of the one or more computer processors, the program instructions comprising:
  - program instructions to receive an indication to load data into a database table included in a database management system, wherein the data consists of a first portion of data and a second portion of data;
  - program instructions to determine whether an existing set of frequency distribution statistics for the data is available, wherein the existing set of frequency distribution statistics are generated independently of the database management system prior to loading the data into the database management system, and wherein the existing set of frequency distribution statistics is generated using substantially all of the data;
  - responsive to determining that an existing set of frequency distribution statistics is not available for the first portion of data but an existing set of frequency distribution statistics is available for the second portion of data, program instructions to generate a set of frequency distribution statistics for the first portion of data, wherein the generated set of frequency distribution statistics is generated by the database management system using a sample of the first portion of data;
  - responsive to generating a set of frequency distribution statistics for the first portion of data that does not have the existing set of frequency distribution statistics available, program instructions to create a first compression dictionary for the first portion of data using the generated set of frequency distribution statistics;
  - program instructions to create a second compression dictionary for the second portion of data using the existing set of frequency distribution statistics for the second portion of data; and
  - program instructions to load the data into the database table using the first compression dictionary and the second compression dictionary.

8. The computer system of claim 7, further comprising program instructions stored on the one or more computer readable storage media for execution by at least one of the one or more computer processors, to:
- responsive to determining that an existing set of frequency distribution statistics for the data is not available, generate a set of frequency distribution statistics for the data;
- create a third compression dictionary using the generated set of frequency distribution statistics; and
- load the data into the database table using the third compression dictionary.

9. The computer system of claim 8, wherein the first compression dictionary, the second compression dictionary, and the third compression dictionary are each a simple lookup table which uses fewer bits to store data when compared to the data itself.

* * * * *